(12) United States Patent
Cheng et al.

(10) Patent No.: US 8,656,481 B2
(45) Date of Patent: Feb. 18, 2014

(54) SYSTEM AND METHOD FOR IPSEC LINK CONFIGURATION

(75) Inventors: Heilung Cheng, Round Lake, IL (US); Francis K. Agozo, Forest Park, IL (US); Jianrong Lin, Arlington Heights, IL (US)

(73) Assignee: General Instrument Corporation, Horsham, PA (US)

( * ) Notice: Subject to any disclaimer, the term of this patent is extended or adjusted under 35 U.S.C. 154(b) by 224 days.

(21) Appl. No.: 12/560,049

(22) Filed: Sep. 15, 2009

(65) Prior Publication Data

US 2011/0066858 A1 Mar. 17, 2011

(51) Int. Cl.
H04L 29/06 (2006.01)
(52) U.S. Cl.
USPC .............................................. 726/14; 713/151
(58) Field of Classification Search
USPC ............................................ 726/14; 713/151
See application file for complete search history.

(56) References Cited

U.S. PATENT DOCUMENTS

| | | | | |
|---|---|---|---|---|
| 7,228,421 B1 * | 6/2007 | Huang et al. | | 713/171 |
| 2006/0288016 A1 * | 12/2006 | Sukumaran | | 707/100 |
| 2007/0199049 A1 * | 8/2007 | Ziebell | | 726/3 |
| 2007/0294744 A1 * | 12/2007 | Alessio et al. | | 726/1 |
| 2008/0310347 A1 * | 12/2008 | Morishige et al. | | 370/328 |

OTHER PUBLICATIONS

A Comprehensive Guide to Virtual Private Networks, vol. II: IBM Nways Router Solutions, Murhammer et al., Nov. 1999.*
Cisco IOS Security Configuration Guide, Release 12.2, 2006.*
RFC 2401—Security Architecture for the Internet Protocol, Internet Engineering Task Force (Nov. 1998).*
RFC 2408—Internet Security Association and Key Management Protocol (ISAKMP), Internet Engineering Task Force (Nov. 1998).*
RFC 2409—The Internet Key Exchange (IKE), Internet Engineering Task Force (Nov. 1998).*
RFC 3706—A Traffic-Based Method of Detecting Dead Internet Key Exchange (IKE) Peers, Internet Engineering Task Force (Feb. 2004).*
D. Piper, "The Internet IP Security Domain of Interpretation for ISAKMP", The Internet Society, RFC 2407, Nov. 1998.

* cited by examiner

Primary Examiner — Jung Kim
Assistant Examiner — Theodore Parsons
(74) Attorney, Agent, or Firm — Lori Anne D. Swanson (57) ABSTRACT

A method for configuring Internet Protocol Security (IPsec) protocol. The method includes configuring IPsec phase 1 Security Associations (SA) lifetimes and soft phase 2 SA lifetimes in a manner enabling efficient Dead Peer Detection recovery of secure communication between client and server in the event of a communication disruption and thereby preventing undesirable sustained periods of non-communication between client and server.

21 Claims, 7 Drawing Sheets

SYSTEM AND METHOD FOR IPSEC LINK CONFIGURATION

BACKGROUND

This invention relates to the field of communication protocols for authenticating, encrypting and decrypting digital information transferred via a stream of data packets.

Figure 1:
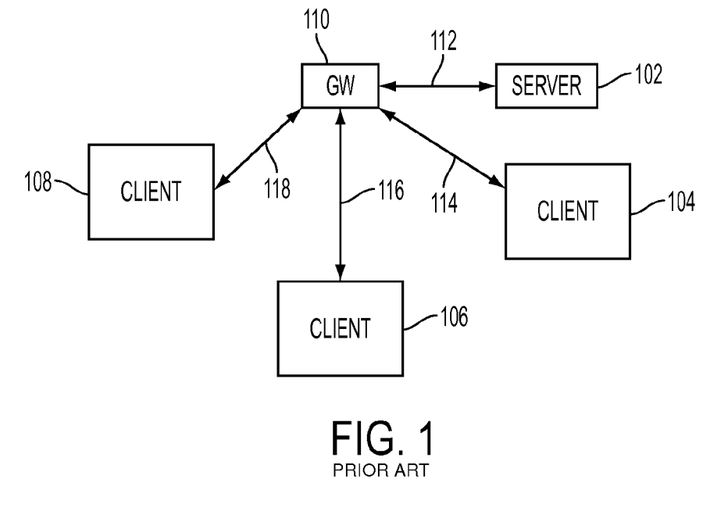
FIG. 1 illustrates a prior art communication system.

FIG. 1 illustrates a communication system 100.

As illustrated in the figure, communication system 100 includes a server 102, a client 104, a client 106 a client 108 and a router 110.

Server 102 is arranged to be in two-way communication with router 110 by way of communication channel 112. Client 104 is arranged to be in two-way communication with router 110 by way of communication channel 114. Client 106 is arranged to be in two-way communication with router 110 by way of communication channel 116. Client 108 is arranged to be in two-way communication with router 110 by way of communication channel 118.

Server 102, client 104, client 106 and client 108 are any device operable to communicate with another device within an Internet Protocol (IP) communication system. Non-limiting examples of such devices include computers and phones. Router 110 manages communication between server 102 and clients 104, 106, and 108 within an Internet Protocol (IP) communication system. Communication channels 112, 114, 116 and 118 may be wired or wireless communication channels.

Internet Protocol Security (IPsec) is a suite of industry standard protocols for securing Internet Protocol (IP) communications by authenticating, encrypting and decrypting each IP packet transferred between communication nodes. IPsec is being standardized by the Internet Engineering Task Force to incorporate secure communications to the widely used IP protocol.

IPsec provides cryptographic authentication and secure communications between two communication network nodes. IPsec supports communication between hosts, between Virtual Private Networks (VPNs) or between host and VPN. A VPN is a computer network in which communication is enabled via virtual circuits. A virtual circuit delivers communication information via packets of information. The packets of information can be routed and delivered to each destination independently from the all the other packets of information.

IPsec defines a set of operations for performing authentication, encryption and decryption for a stream of data comprised of packets. IPsec operates by adding new protocol headers to each transmitted packet. An authentication code is calculated for each packet using a secret key which is only known by the communicating parties and is transmitted within the packet.

IPsec implements Internet Security Association and Key Management Protocol (ISAKMP) for authentication, creation and management of Security Associations (SA), generation of keys and mitigation of threats. ISAKMP does not specify a specific key exchange, however, IPsec implements Internet Key Exchange (IKE) for creating SAs between communicating nodes. An IPsec SA determines the operations to be performed on each packet. Appropriate authentication, encryption and decryptions methods are determined by an SA. Additionally, an SA determines the parameters necessary for securely communicating between the nodes using cryptographic algorithms and cryptographic keys.

To simplify an explanation of conventional secure communication between two devices, an example of conventional secure communication between server 102 and client 104 will now be provided with reference to FIGS. 2-5.

Figure 2:
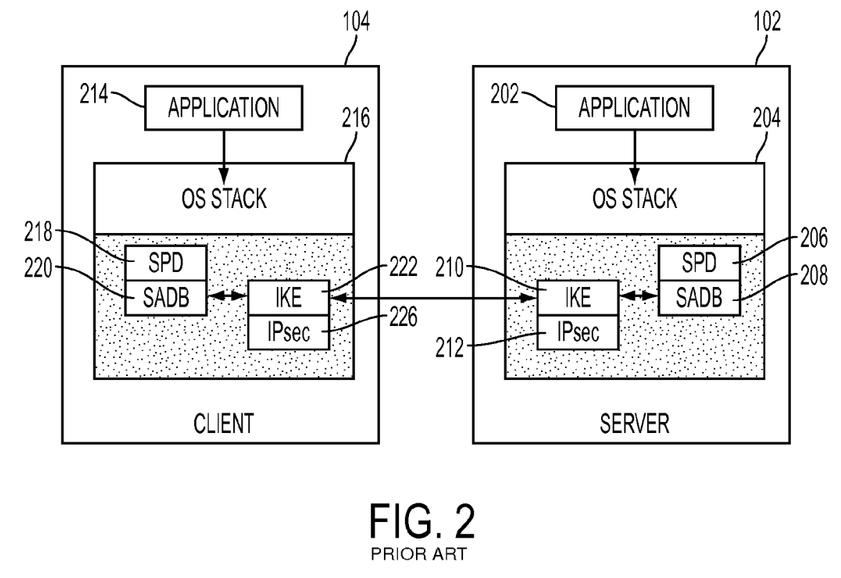
FIG. 2 is a functional level diagram of a prior art communication between a server and a client.

FIG. 2 is a functional level diagram of conventional communication between server 102 and client 104.

As illustrated in the figure, server 102 includes an application 202 and an IP kernel operating system stack 204, which includes a Security Policy Database (SPD) 206, a Security Association Database (SADB) 208, an Internet Key Exchange (IKE) protocol portion 210 and an Internet Protocol security (IPsec) portion 212. Client 104 includes an application 214 and an IP kernel operating system stack 216, which includes a SPD 218, a SADB 220, an IKE protocol portion 222 and an IPsec portion 226.

SADB 208 is a database that contains parameters associated with each active SA, as will be explained in more detail below, and is populated automatically from IKE protocol portion 210. Similarly, SADB 220 is a database that contains parameters associated with each active SA, and is populated automatically from IKE protocol portion 222.

SPD 206 is a database that specifies filter lists and associated settings that determine the status of all inbound or outbound IP traffic for server 102. Inbound packets are checked to ensure that they have been secured according to policy. Outbound packets are permitted, blocked, or secured, according to policy. For secured traffic, the security policy that is used is a negotiated SA, which is stored in SADB 208. Similarly, SPD 218 is a database that specifies filter lists and associated settings that determine the status of all inbound or outbound IP traffic for client 104. Inbound packets are checked to ensure that they have been secured according to policy. Outbound packets are permitted, blocked, or secured, according to policy. For secured traffic, the security policy that is used is the negotiated SA, as will be described in greater detail below, and which is stored in SADB 220.

IKE protocol portion 210 receives authentication and security settings from IPsec portion 212 and waits for requests to negotiate SAs for server 102. When IKE protocol portion 210 receives a request to negotiate an SA from IPsec portion 212, IKE protocol portion 210 negotiates both phase 1 SAs and phase 2 SAs with IKE protocol potion 222 based on the request of IPsec portion 212. After IKE protocol portion 210 has negotiated an SA, IKE protocol portion 210 sends the SA settings to IPsec portion 212. IKE protocol portion 222 is operable to perform the same functions for client 104.

IPsec portion 212 retrieves IPSec policy from an Active Directory domain (not shown), a configured set of local policies (not shown), or a local cache (not shown) for server 102. IPsec portion 212 then distributes authentication and security settings to IKE protocol portion 210. IPsec portion 226 is operable to perform the same functions for client 104.

Before client 104 can securely communicate with server 102, a secure communication link must be established. A conventional method of establishing a secure communication link between client 104 and server 102 will now be discussed.

Presume, in this example, that client 104 initiates communication with server 102. First application 214 sends a first packet to OS stack 216. IPsec portion 226 intercepts the packet and initiates a negotiation with server 102. IKE protocol portion 222 of client 104 then performs negotiation with IKE protocol portion 210 of server 102. A more detailed discussion of secure communication will now be described.

IPsec includes two phases of setup during the establishment of a link between communication nodes. In a phase 1 SA, the security protocol and IKE are negotiated between peers for protecting all SAs and ISAKMP. Following the phase 1 SA, phase 2 SAs are implemented. A single phase 2

SA may be implemented or multiple simultaneous phase 2 SAs may be implemented. In a phase 2 SA, an SA is established between peers.

The lifetime of phase 1 SA is controlled by a finite timer. In phase 2 SA, the lifetime of SAs are controlled by either a finite timer or by an amount of data transferred between peers.

The finite timer methodology for controlling SAs is most commonly implemented for IPsec. A finite timer is initialized to a specific time value with the expiration of the timer indicating a specific action is to be performed by the communicating peers. Two types of finite timers are implemented for phase 2 SA: soft-lifetime timers and hard-lifetime timers. These timers are generated in the IPsec portion of the device initiating the communication, in this example, IPsec portion 226 of client 104. Further, once generated and negotiated, these timers are stored in the IPsec portions of each device, in this example, IPsec portion 226 of client 104 and IPsec portion 212 of server 102.

Phase 2 SA hard-lifetime timer and the initial soft-lifetime timer start at approximately the same time. In general, the time value of the hard-lifetime timer is configured to be longer than the time value of the soft-lifetime timer. Therefore, when the initial soft-lifetime timer expires, the hard-lifetime timer continues for a predetermined amount of time. Subsequent soft-lifetime timers may be initiated following the expiration of a soft-lifetime timer. Termination of the first soft-lifetime timer while the hard-lifetime timer continues, enables establishment of a new phase 2 SA between peers. Termination of a hard-lifetime timer of a phase 2 SA while a phase 1 SA is active, results in the replacement of the existing phase 2 SA with a new phase 2 SA.

Expiration of a phase 1 SA does not automatically result in the creation of a new SA, as a new SA may only be established after a request to establish a new phase 1 SA.

Figure 3:
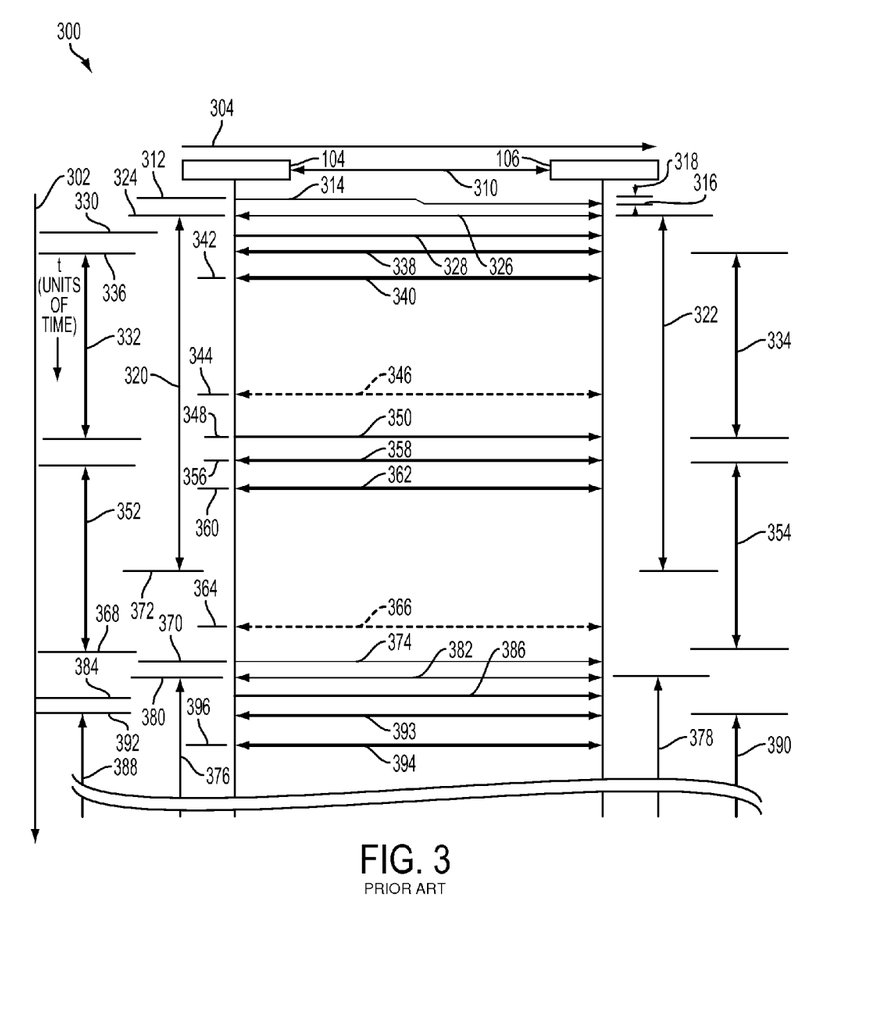
FIG. 3 illustrates a prior art IPsec communication link protocol.

To facilitate discussion, FIG. 3 illustrates a conventional IPsec communication process 300.

In the figure, a y-axis 302 represents units of time increasing with progression from the top of the figure to the bottom of the figure. An x-axis 304 represents exchanges of communication between a client 104 and a server 102 via a communication channel 310.

Before conventional IPsec communication process 300 is discussed in detail, please consider the following introduction to some aspects.

Bi-directional vertical arrows 320, 322, 376 and 378 represent phase 1 SA timers. A phase 1 SA timer counts down the time value of a phase 1 SA. In the figure, bi-directional vertical arrows 320, 322, 376 and 378 are illustrated with the same weight to represent a similar function.

Bi-directional vertical arrows 332, 334, 352, 354, 388 and 390 represent soft phase 2 SA timers. A phase 2 SA timer is timer that counts down the time value of a phase 2 SA. A soft-lifetime timer is conventionally set to a portion of the phase 2 SA timer, e.g., 80%. In the figure, bi-directional vertical arrows 332, 334, 352, 354, 388 and 390 are illustrated with the same weight to represent a similar function.

Unidirectional horizontal arrows 314 and 374 represent phase 1 SA negotiation initiations. A phase 1 SA negotiation initiation is a communication protocol wherein client 104 contacts server 102 to exchange security keys, authentication information and phase 1 SA time values. In the figure, unidirectional horizontal arrows 314 and 374 are illustrated with the same weight to represent a similar function.

Bi-directional horizontal arrows 326 and 382 represent phase 1 SA negotiation completions. In the figure, bi-directional horizontal arrows 326 and 382 are illustrated with the same weight to represent a similar function.

Unidirectional horizontal arrows 328, 350 and 386 represent phase 2 SA negotiation initiations. A phase 2 SA negotiation initiation is a communication protocol wherein client 104 contacts server 102 to exchange updated security keys, updated authentication information and phase 2 SA hard-lifetime values. In the figure, unidirectional horizontal arrows 328, 350 and 386 are illustrated with the same weight to represent a similar function.

Bi-directional horizontal arrows 338, 358 and 393 represent phase 2 SA negotiation completions. In the figure, bi-directional horizontal arrows 338, 358 and 393 are illustrated with the same weight to represent a similar function.

Bi-directional horizontal arrows 340, 362 and 394 represent link initiations. A link initiation is the start of a secure communication channel, wherein client 104 and server 102 may communicate with one another in an encrypted manner. In the figure, bi-directional horizontal arrows 340, 362 and 394 are illustrated with the same weight to represent a similar function.

Bi-directional dotted horizontal arrows 346 and 366 represent link completions. A link completion is the end of a secure communication channel, wherein client 104 and server 102 may no longer securely communicate with one another. In the figure, bi-directional horizontal dotted arrows 346 and 366 are illustrated with the same weight to represent a similar function.

Communication between client 104 and server 102 is bi-directional, i.e., client 104 can initiate and transfer data to server 102, and server 102 can initiate and transfer data to client 104.

Now for a more detailed discussion of conventional IPsec communication process 300.

Client 104 seeking to communicate securely with server 102 transmits a phase 1 SA negotiation initiation 314 to server 102 via communication channel 310 at a time 312. Phase 1 SA negotiation initiation 314 will arrive at server 102 at a time 316 after experiencing a channel path delay 318. To simplify FIG. 3, the channel path delays between client 104 and server 102 are not shown for every instance of communication between client 104 and server 102.

Following phase 1 SA negotiation initiation 314, client 104 and server 102 negotiate the value of a phase 1 SA timer 320 and a phase 1 SA timer 322. The values for phase 1 SA timer 320 and phase 1 SA timer 322 are identical and client 104 is responsible for maintaining phase 1 SA timer 320 and server 102 is responsible for maintaining phase 1 SA timer 322.

Following phase 1 SA negotiation initiation 314, client 104 and server 102 negotiate a method for Internet Key Exchange (IKE) for performing secure communication between client 104 and server 102 via communication channel 310. The phase 1 SA negotiation between client 104 and server 102 is completed at a time 324 and is represented by a phase 1 SA negotiation completion 326. In conjunction with phase 1 SA negotiation completion 326, client 104 initializes phase 1 SA timer 320 and server 102 initializes phase 1 SA timer 322.

Following phase 1 SA negotiation completion 326, client 104 communicates a phase 2 SA negotiation initiation 328 to server 102 at a time 330. Phase 2 SA negotiation initiation 328 begins the process of negotiating an IPsec SA.

During the negotiation of IPsec SA, client 104 and server 102 agree on the protocol for communication between client 104 and server 102.

In one conventional communication method, the hard lifetime of phase 2 SA is determined during the IPSec SA negotiation. The value of a soft phase 2 SA timer 332 and a soft phase 2 SA timer 334 are derived from the hard lifetime later. For example, in one example IPsec-tool that implements IKE, the soft lifetime of phase 2 SA is set to 80% of the hard phase 2 SA lifetime. The values for soft phase 2 SA timer 332 and soft phase 2 SA timer 334 are identical.

During the negotiation of IPsec SA, client 104 and server 102 agree on a shared Data Encryption Standard (DES) or Triple Data Encryption Algorithm (TDEA) key.

DES is a methodology or algorithm for encrypting data. DES is based on a secret key algorithm using a 56-bit key. TDEA performs three iterations of DES methodology to each set of data to be communicated for increased security between communication nodes.

Negotiation of IPsec SA is completed at a time 336 and is represented by a phase 2 SA negotiation completion 338. Client 104 initiates soft phase 2 SA timer 332 and server 102 initiates soft phase 2 SA timer 334 in conjunction with phase 2 SA negotiation completion 338.

Following phase 2 SA negotiation completion 338, a link initiation 340 occurs at a time 342 initiating secure data communication between client 104 and server 102 until a time 344 as represented by a link completion 346.

At a time 348, client 104 seeks to negotiate a new IPsec SA with server 102 and communicates a phase 2 SA negotiation initiation 350 to server 102.

During the negotiation of the new IPsec SA, client 104 and server 102 agree on the protocol for communication and a shared DES or TDEA key. At a time 356, IPsec SA negotiation is complete and is represented by a phase 2 SA negotiation completion 358. After phase 2 SA negotiation completion 358, client 104 derives and implements soft phase 2 SA timer 352 and server 102 derives and implements soft phase 2 SA timer 354.

Between a time 360, as represented by a link initiation 362, and a time 364, as represented by a link completion 366, secure data communication occurs between client 104 and server 102.

At a time 368, phase 2 SA communications between client 104 and server 102 are terminated with the expiration of soft phase 2 SA timer 352 and soft phase 2 SA timer 354.

At a time 370, client 104 seeks to communicate with server 102. At this point, since phase 1 SA timer 320 and phase 1 SA timer 322 both expired previously at a time 372, client 104 must seek to communicate with server 102 via a new phase 1 SA as represented by a phase 1 SA negotiation initiation 374. Following phase 1 SA negotiation initiation 374, client 104 and server 102 negotiate the value of a new phase 1 SA timer 376 and a phase 1 SA timer 378. At a time 380, phase 1 SA is complete as represented by a phase 1 SA negotiation completion 382, and client 104 initiates phase 1 SA timer 376 and server 102 initiates phase 1 SA timer 378.

At a time 384, client 104 communicates a phase 2 SA negotiation initiation 386 with server 102 initiating negotiation of IPsec SA. During the negotiation of IPsec SA, client 104 and server 102 agree on the protocol for communication. At a time 392, negotiation of IPsec SA is complete and is represented by a phase 2 SA negotiation completion 393. After phase 2 SA negotiation completion 393, client 104 derives and implements soft phase 2 SA timer 388 and server 102 derives and implements soft phase 2 SA timer 390. The values for soft phase 2 SA timer 388 and soft phase 2 SA timer 390 are identical.

Following phase 2 SA negotiation completion 393, a link initiation 394 occurs at a time 396 and secure data communication between client 104 and server 102 ensues.

From the discussion above, in this example, client 104 and server 102 may communicate over a secure channel between link initiation 340 at time 342 and link completion 346 at time 344. Further, in this example, client 104 and server 102 may communicate over a secure channel between link initiation 362 at time 360 and link completion 366 at time 364.

At time 364, although soft phase 2 SA timer 352 and soft phase 2 SA timer 354 continue, phase 1 SA timer 320 and phase 1 SA timer 322 have timed out. Accordingly client 104 and server 102 may not communicate over a secure channel until a new phase 1 SA and a new phase 2 SA are negotiated and completed. In other words, in this example, after time 364, client 104 and server 102 may not communicate over a secure channel until after link initiation 394 at time 396.

FIG. 3 illustrates a conventional implementation of secure communication between client 104 and server 102 via IPsec. The interaction and related timing necessary for client 104 and server 102 to communicate in a secure manner via IPsec is illustrated. The communication between client 104 and server 102 is not disrupted in any manner and completes communication successfully.

IPsec provides an optional mechanism, Dead Peer Detection (DPD), for recovering an SA which has been interrupted as a result of the loss of a peer. DPD relies on the IKE Notify messages via phase 1 SA for detecting the interruption of an SA. IKE Notify messages provide a mechanism for IPsec nodes to query and communicate status information.

A common occurrence for a disruption in communication results after the re-initialization of a peer. A node detecting the interruption or re-initialization of a peer via DPD can re-initialize the SA between the peers with recovery of secure communication occurring very quickly.

However, a problem with IPsec has been observed when a peer is reinitialized during the process of secure communication via an SA in which a phase 1 SA no longer exists as a result of the expiration of a phase 1 SA timer. Since a phase 1 SA does not exist, DPD cannot be implemented and the secure communications between the peers cannot be recovered until the soft phase 2 SA timer expires, which in some instances can be several hours.

Figure 4:
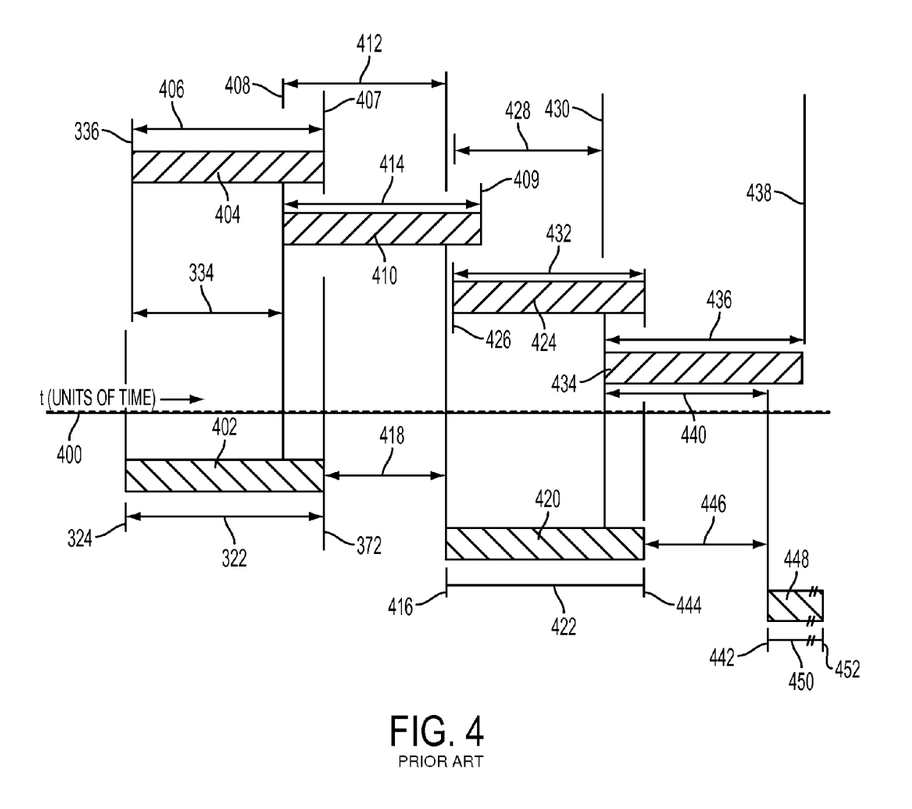
FIG. 4 illustrates a prior art relationship diagram between phase 1 SA and phase 2 SA resulting in periods of time when DPD is unavailable for secure communication recovery.

To facilitate discussion of the loss of synchronization between peers with respect to phase 1 SA and phase 2 SA, FIG. 4 illustrates the conventional relationship of phase 1 SAs, phase 2 SAs, phase 1 SA timers, soft phase 2 SA timers and hard phase 2 SA timers between a client and a server. FIG. 4 illustrates how sustained and long periods of time can be experienced in which DPD mechanism cannot be used for detecting and restoring communication between peers as a result of the non-existence or expiration of a phase 1 SA.

Negotiation of independent phase 1 SA timers and soft phase 2 SA timers may create periods during which a phase 1 SA does not exist between peers. In the event a peer attempts to reinitialize, after communication is disrupted and a phase 1 SA does not exist, the re-initialization event cannot be consummated and resulting in extended interruptions of secure communication between the peers for an extended period of time.

There is a problem associated with conventional implementation of IPsec discussed above with respect to FIG. 1, which will now be described with reference to FIG. 4 and FIG. 5.

An x-axis 400 of FIG. 4 represents units of time, increasing with progression from left to right on the figure.

Before FIG. 4 is discussed in detail, please consider the following introduction to some aspects.

The area below x-axis 400 illustrates phase 1 SAs between client 104 and server 102. The area above x-axis 400 illustrates phase 2 SAs between client 104 and server 102.

Rectangular blocks 404, 410, 424 and 434 represent phase 2 SAs. Horizontal arrows 334, 412, 428 and 440 represent soft phase 2 SA timers. Horizontal arrows 406, 414, 432 and 436 represent hard phase 2 SA timers.

Rectangular blocks 402, 420 and 448 represent phase 1 SAs. Horizontal arrows 322, 422 and 450 represent phase 1 SA timers. Horizontal arrows 418 and 446 represent unavailable DPD.

In order to simplify FIG. 4, all timers will be referenced with respect to server 102 illustrated in FIG. 3.

Now for a more detailed discussion of FIG. 4.

At time 324, a phase 1 SA 402 is initiated between client 104 and server 102. The lifetime of phase 1 SA 402 is negotiated between client 104 and server 102 and is represented by phase 1 SA timer 322.

At time 336, following initiation of phase 1 SA 402, a phase 2 SA 404 is initiated between client 104 and server 102. The lifetime of phase 2 SA 404 is negotiated between client 104 and server 102. During negotiation of phase 2 SA 404, the time value of hard phase 2 SA timer 406 is negotiated and the time value of soft phase 2 SA timer 334 is derived from hard phase 2 SA timer 406. In this example, phase 2 SA 404 has a hard phase 2 SA timer 406 and soft phase 2 SA timer 334.

Soft phase 2 SA timer 334 is initiated at time 336 and expires at a time 408. Soft phase 2 SA timer 334 determines the time at which a new phase 2 SA must be initiated to retain secure communication between client 104 and server 102. Hard phase 2 SA timer 406 is initiated at time 336 and expires at a time 407. Hard phase 2 SA timer 406 determines the lifetime of phase 2 SA 404.

At time 408, soft phase 2 SA timer 334 expires. At time 408, and prior to the expiration of hard phase 2 SA timer 406, a phase 2 SA 410 is initiated between client 104 and server 102. Phase 2 SA 410 has a soft phase 2 SA timer 412 and a hard phase 2 SA timer 414. During the negotiation of phase 2 SA 410, the time value for soft phase 2 SA timer 412 and the time value for hard phase 2 SA timer 414 are determined.

Soft phase 2 SA timer 412 is initiated at time 408 and expires at a time 416. Soft phase 2 SA timer 412 determines the time at which a new phase 2 SA must be initiated to retain secure communication between client 104 and server 102. Hard phase 2 SA timer 414 is initiated at time 408 and expires at a time 409. Hard phase 2 SA timer 414 determines the lifetime of phase 2 SA 410.

At time 372, phase 1 SA timer 322 expires, resulting in the termination of phase 1 SA 402. The time period between the expiration of phase 1 SA timer 322 at time 372 and time 416 represented as the initiation of a new phase 1 SA 420 is denoted as an unavailable DPD 418. During the time period as referenced by unavailable DPD 418, an interruption occurring between client 104 and server 102 will result in a lack of secure communication occurring between client 104 and server 102 until the start of phase 1 SA 420 initiated at time 416.

The lifetime of phase 1 SA 420 is negotiated between client 104 and server 102 and is represented by a phase 1 SA timer 422.

Following the initiation of phase 1 SA 420 at time 416, a phase 2 SA 424 is initiated between client 104 and server 102 at a time 426. Phase 2 SA 424 has a soft phase 2 SA timer 428 and a hard phase 2 SA timer 432. During the negotiation of phase 2 SA 424, the time value for hard phase 2 SA timer 432 is negotiated. The time value for soft phase 2 SA timer 428 is derived from the negotiated time value from hard phase 2 SA timer 432.

Soft phase 2 SA timer 428 is initiated at time 426 and expires at a time 430. Soft phase 2 SA timer 428 determines the time at which a new phase 2 SA must be initiated to retain secure communication between client 104 and server 102.

Hard phase 2 SA timer 432 is initiated at time 426 and expires at a time 444. Hard phase 2 SA timer 432 determines the lifetime of phase 2 SA 424.

At time 430, soft phase 2 SA timer 428 of phase 2 SA 424 expires, enabling initiation between client 104 and server 102 of a phase 2 SA 434. Phase 2 SA 434 has a soft phase 2 SA timer 440 and a hard phase 2 SA timer 436. During the negotiation of phase 2 SA 434, the time value for hard phase 2 SA timer 436 is negotiated. Then the time value for soft phase 2 SA timer 440 is derived from the time value for hard phase 2 SA timer 436.

Soft phase 2 SA timer 440 is initiated at time 430 and expires at a time 442. Soft phase 2 SA timer 440 determines the time at which a new phase 2 SA must be initiated to retain secure communication between client 104 and server 102. Hard phase 2 SA timer 436 is initiated at time 430 and expires at a time 438. Hard phase 2 SA timer 436 determines the lifetime of phase 2 SA 434.

At time 444, phase 1 SA timer 422 expires terminating phase 1 SA 420. The time period from time 444 to time 442 represents a period in which a disruption between client 104 and server 102 cannot be resolved via DPD. The disruption cannot be resolved between time 444 and time 442 since a phase 1 SA is not available. The time period during which the disruption cannot be resolved is designated as an unavailable DPD 446. A disruption occurring during unavailable DPD 446 results in a loss of secure communication between client 104 and server 102 which cannot be restored until initiation of a new phase 1 SA as represented by a phase 1 SA 448 starting at time 442 and expiring at a time 452. The lifetime of phase 1 SA 448 is negotiated by client 104 and server 102 and is denoted as a phase 1 SA timer 450 which starts at time 442 and expires at time 452.

FIG. 4 illustrates the relationship between phase 1 SA and phase 2 SA of a communications exchange between client 104 and server 102. FIG. 4 highlights periods of time denoted as unavailable DPD 418 and unavailable DPD 446 during which an occurrence of a communication disruption would result loss of secure communication between client 104 and server 102. A disruption during which DPD was not available could cause the communication between client 104 and server 102 to be severely impeded and could require a significant amount of time for recovery.

Figure 5:
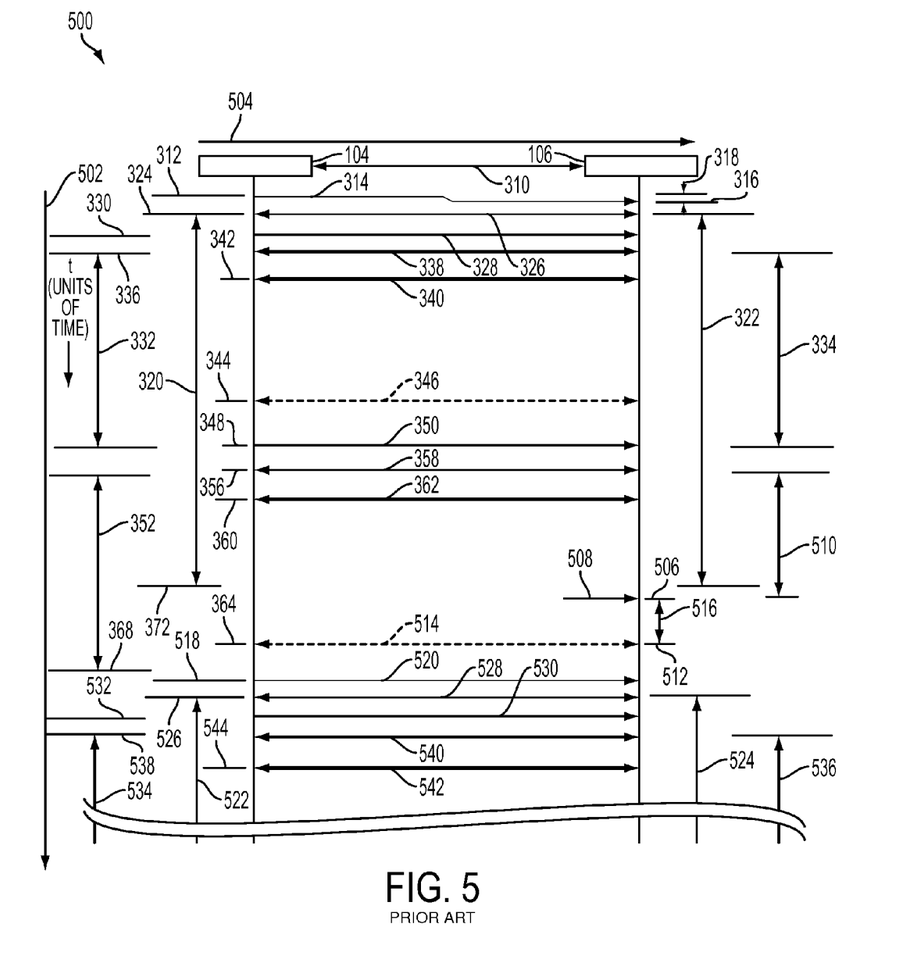
FIG. 5 illustrates a prior art IPsec link communication protocol with a disruption of secure communication resulting in a prolonged period of non-communication.

To facilitate discussion of a loss of secure communication between client 104 and server 102, FIG. 5 illustrates a link interruption 500, a simplified IPsec communication exchange experiencing an occurrence of communication disruption.

A y-axis 502 of FIG. 5 is illustrated by variable t in units of time with an increase in variable t as movement progresses from the top of the page to the bottom of the page. An x-axis 504 represents exchanges of communication between client 104 and server 102 via communication channel 310. Communication channel may include two channels. One channel is used to transmit user data and uses a phase 2 SA. The other channel depends on the phase 1 SA for a phase 2 SA negotiation message and DPD messages.

Before conventional IPsec link interruption 500 is discussed in detail, please consider the following introduction to some aspects.

Bi-directional vertical arrows 522 and 524 represent phase 1 SA timers. A phase 1 SA timer counts down the time value of a phase 1 SA. In the figure, bi-directional vertical arrows 522 and 524 are illustrated with the same weight to represent a similar function.

Bi-directional vertical arrows 534 and 536 represent soft phase 2 SA timers. A soft phase 2 SA timer is a lifetime timer that counts down the time value of a phase 2 SA. A soft-lifetime timer is conventionally set to a portion of the phase 1 SA timer, e.g., 80%. In the figure, bi-directional vertical arrows 534 and 536 are illustrated with the same weight to represent a similar function.

Unidirectional horizontal arrow 520 represents phase 1 SA negotiation initiation. A phase 1 SA negotiation initiation is a communication protocol wherein client 104 contacts server 102 to exchange security keys, authentication information and phase 1 SA time values.

Bi-directional horizontal arrow 528 represents phase 1 SA negotiation completion.

Unidirectional horizontal arrow 530 represents phase 2 SA negotiation initiation. A phase 2 SA negotiation initiation is a communication protocol wherein client 104 contacts server 102 to exchange updated security keys, updated authentication information, phase 2 SA soft-lifetime time values and phase 2 SA hard-lifetime time values.

Bi-directional horizontal arrow 540 represents a phase 2 SA negotiation completion.

Bi-directional horizontal arrow 542 represents a link initiation. A link initiation is the start of a secure communication channel, wherein client 104 and server 102 may securely communicate with one another.

Bi-directional horizontal dotted arrow 514 represents an unsuccessful link completion. An unsuccessful link completion is the end of a secure communication channel, wherein communication between client 104 and server 102 was unsuccessful and incomplete and client 104 and server 102 may no longer securely communicate with one another until communication has been reestablished.

The loss of secure communication is due to the disruption for server 102 occurring at a time 506 designated as a communication disruption 508.

The operation of FIG. 5 is identical to FIG. 3 until the occurrence of communication disruption 508 at time 506. Communication disruption 508 occurs after the expiration of phase 1 SA timer 322 maintained by server 102. Communication disruption 508 also occurs after the expiration of phase 1 SA timer 320 maintained by client 104. Communication disruption 508 results in the premature termination of a soft phase 2 SA timer 510.

Since a phase 1 SA does not exist at time 506 with the occurrence of communication disruption 508, client 104 is not aware of communication disruption 508 and continues to transmit data via communication channel 310. Server 102 ignores or discards the secure information transmitted by client 104 since server 102 does not have a phase 1 SA and phase 2 SA in operation due to communication disruption 508. At a time 512, client 104 completes transmitting secure data to server 102 which is designated as an unsuccessful link completion 514. The time period between time 506 and time 512, during which server 102 discards the data transmitted by client 104, is designated as a discarded data 516.

Following the expiration of soft phase 2 SA timer 352 at time 368, a new phase 1 SA is initiated at a time 518 and is designated as a phase 1 SA negotiation initiation 520.

Following phase 1 SA negotiation initiation 520, client 104 and server 102 negotiate the value of a phase 1 SA timer 522 and a phase 1 SA timer 524. The values for phase 1 SA timer 522 and phase 1 SA timer 524 are identical and client 104 is responsible for maintaining phase 1 SA timer 522 and server 102 is responsible for maintaining phase 1 SA timer 524.

Following phase 1 SA negotiation initiation 520, client 104 and server 102 negotiate a method for Internet Key Exchange (IKE) to perform secure communication between client 104 and server 102 via communication channel 310. The phase 1 SA negotiation between client 104 and server 102 is completed at a time 526 and is represented by a phase 1 SA negotiation completion 528.

Following phase 1 SA negotiation completion 528, client 104 communicates a phase 2 SA negotiation initiation 530 to server 102 at a time 532. Phase 2 SA negotiation initiation 530 begins the process of negotiating an IPsec SA.

During the negotiation of IPsec SA, client 104 and server 102 agree on the protocol for communication to occur between client 104 and server 102.

The value of a soft phase 2 SA timer 534 and a soft phase 2 SA timer 536 are derived after the negotiation of hard phase 2 SA timers of IPsec SA. The values for soft phase 2 SA timer 534 and soft phase 2 SA timer 536 are identical.

During the negotiation of IPsec SA, client 104 and server 102 agree on a shared DES or TDEA key.

Negotiation of IPsec SA is completed at a time 538 and is represented by a phase 2 SA negotiation completion 540. Client 104 initiates soft phase 2 SA timer 534 and server 102 initiates soft phase 2 SA timer 536 upon phase 2 SA negotiation completion 540.

Following phase 2 SA negotiation completion 540, a link initiation 542 occurs at a time 544 with secure data communication occurring between client 104 and server 102 following link initiation 542.

As illustrated in FIG. 5, a disruption in service during secure communications via IPsec can result in prolonged periods of time in which communication cannot be performed between client 104 and server 102 as represented by discarded data 516.

When server 102 crashes, there is a disruption of service. If client 104 crashes or reboots, client 104 will try to establish phase 1 and phase 2 SAs immediately when it comes back. In the case where server 102 crashes, client 104 will continue to use the existing phase 2 SAs to transmit data until the existing phase 2 SAs reach their soft lifetime and new phase 1 and phase 2 SAs are established.

A problem with conventional IPsec methods occurs when a service disruption occurs, e.g., the server 102 crashes, and there is no phase 1 SA available on server 102 for recovery of communications. If the lifetimes of phase 1 and phase 2 are chosen independently, there may be times in which a phase 1 SA does not exist and secure communications cannot be recovered until an existing phase 2 SA reaches a soft-lifetime termination. Following the soft-lifetime termination, client 104 and server 102 can renegotiate, resynchronize and continue with secure communication.

What is needed is a method for communication via IPsec that prevents prolonged periods of non-communication due to service disruptions.

BRIEF SUMMARY

An aspect of the present invention provides a system and method for communication via IPsec that prevents prolonged periods of non-communication due to service disruptions.

In accordance with an aspect of the present invention, a method is provided for communicating between a first communication device and a second communication device. The method comprises establishing a phase 1 security association between the first communication device and the second communication device and establishing a phase 2 security association between the first communication device and the second communication device. The phase 1 security association has a phase 1 SA timer corresponding to a time value of the phase 1 security association. The phase 2 security association has a soft phase 2 security association timer and a hard phase 2 security association timer. The soft phase 2 security association timer corresponds to a time value of the soft phase 2 security association. The hard phase 2 security association timer corresponds to a time value of the hard phase 2 security association. The time value of the soft phase 2 security association is less than the time value of the hard phase 2 security association. The time value of the phase 1 security association is an integer multiple of the time value of the soft phase 2 security association.

Additional advantages and novel features of the invention are set forth in part in the description which follows, and in part will become apparent to those skilled in the art upon examination of the following or may be learned by practice of the invention. The advantages of the invention may be realized and attained by means of the instrumentalities and combinations particularly pointed out in the appended claims.

BRIEF SUMMARY OF THE DRAWINGS

The accompanying drawings, which are incorporated in and form a part of the specification, illustrate an exemplary embodiment of the present invention and, together with the description, serve to explain the principles of the invention. In the drawings.

DETAILED DESCRIPTION

An aspect of the present invention provides a method for configuring phase 1 SA and phase 2 SA timing agreements between server and client which prevents prolonged service disruptions. These prolonged service disruptions are avoided by initializing timing agreements between server and client in such a way to uniformly enable the existence of a phase 1 SA during secure communication which allows recovery from a service disruption via DPD.

In accordance with an aspect of the present invention, phase 1 and phase 2 lifetimes are configured using the following equation:

$$\text{Phase 1 lifetime} = (\text{Phase 2 soft-lifetime}) * N, \quad (1)$$

where N is a positive integer.

Equation (1) configures the expiration of phase 1 SA and phase 2 SA soft-lifetimes to occur simultaneously, which enables a phase 1 SA to be uniformly available during secure communications, thus enabling efficient recovery from service disruptions via DPD and further enabling the continuation of secure communications.

In an example embodiment, the expiration of phase 1 SA and phase 2 SA soft-lifetimes are configured in accordance with equation (1) after every phase 2 negotiation between a client and a server. A client and a server may configure the expiration of phase 1 SA and phase 2 SA soft-lifetimes in accordance with equation (1) and adjust timing agreements as necessary.

An aspect of the present invention will now be discussed below with reference to FIGS. 6-8.

Figure 6:
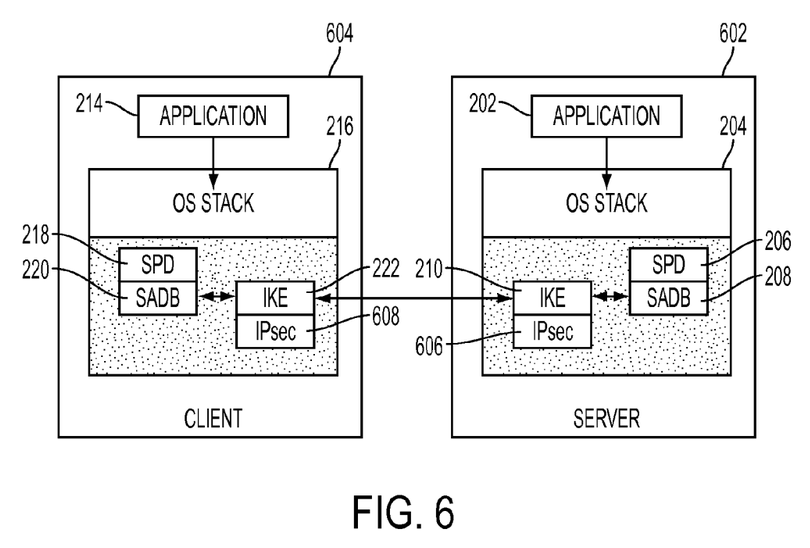
FIG. 6 is a functional level diagram of communication between a server and a client in accordance with an aspect of the present invention.

FIG. 6 is a functional level diagram of communication between server 606 and client 604 in accordance with an aspect of the present invention.

FIG. 6 differs from the functional level diagram of the convention communication discussed above with reference to FIG. 4, in that IPsec portion 412 and IPsec portion 426 have been replaced with IPsec portion 608 and IPsec portion 610, respectively. More specifically, in accordance with an aspect of the present invention, at least one of IPsec portion 608 and IPsec portion 610 will be operable to configure phase 1 and phase 2 lifetimes using equation (1) discussed above.

Before client 604 can securely communicate with server 602, a secure communication link must be established. A method of establishing a secure communication link between client 604 and server 602 in accordance with an aspect of the present invention will now be discussed.

Presume, in this example, that client 604 initiates communication with server 602. First application 214 sends a first packet to OS stack 216. IPsec portion 608 intercepts the packet and initiates a negotiation with server 602. IKE protocol portion 222 of client 604 then performs negotiation with IKE protocol portion 210 of server 602. A more detailed discussion of secure communication will now be described.

Figure 7:
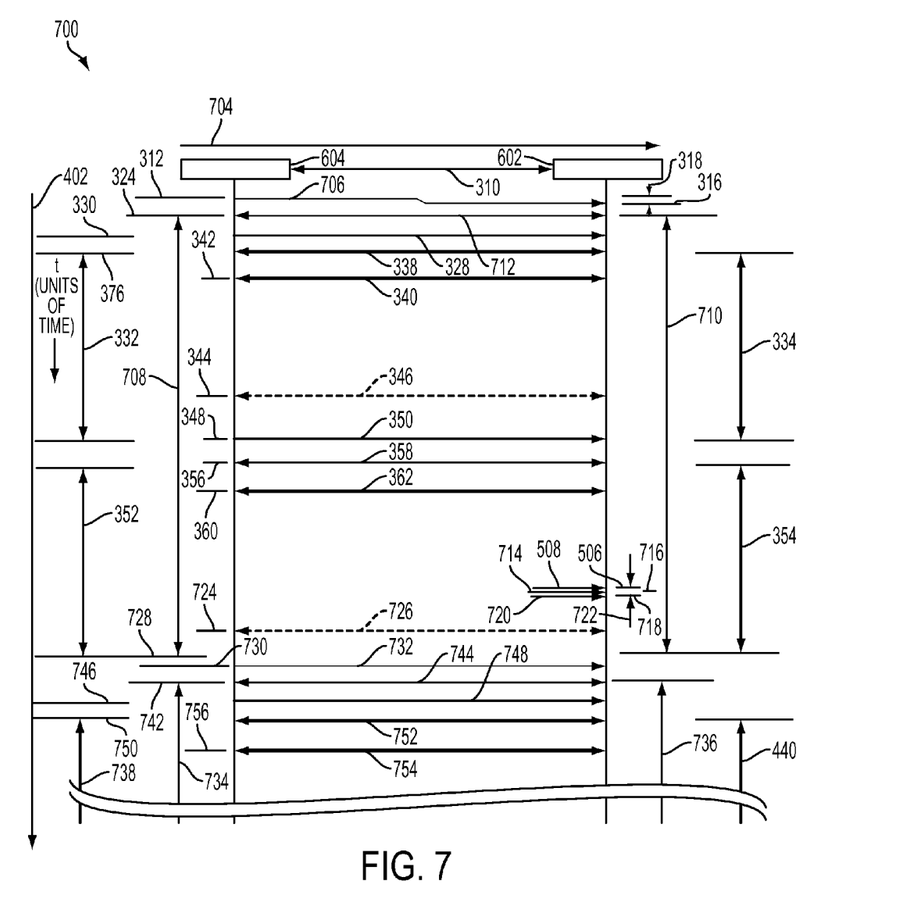
FIG. 7 illustrates, in accordance with an embodiment of the present invention, the recovery of secure communications for an IPsec link communication protocol via DPD in the event of a communication disruption.

FIG. 7 illustrates, in accordance with an embodiment of the present invention, a link communication 700, a simplified IPsec communication exchange. A y-axis 702 represents the variable t in units of time with variable t increasing with progression from the top of the page to the bottom of the page. An x-axis 704 represents exchanges of communication between client 604 and server 602 via communication channel 310.

Before conventional IPsec link communication 700 is discussed in detail, please consider the following introduction to some aspects.

Bi-directional vertical arrows 708, 710, 734 and 736 represent phase 1 SA timers. A phase 1 SA timer counts down the time value of a phase 1 SA. In the figure, bi-directional vertical arrows 708, 710, 734 and 736 are illustrated with the same weight to represent a similar function.

Bi-directional vertical arrows 738 and 740 represent soft phase 2 SA timers. A phase 2 SA timer is a hard-lifetime timer that counts down the time value of a phase 2 SA. A soft-lifetime timer is conventionally set to a portion of the hard-lifetime timer, e.g., 80%. In the figure, bi-directional vertical arrows 738 and 740 are illustrated with the same weight to represent a similar function.

Unidirectional horizontal arrows 706 and 732 represent phase 1 SA negotiation initiations. A phase 1 SA negotiation initiation is a communication protocol wherein client 604 contacts server 602 to exchange security keys, authentication information and phase 1 SA time values. In the figure, unidirectional horizontal arrows 706 and 732 are illustrated with the same weight to represent a similar function.

Bi-directional horizontal arrows 712 and 744 represent phase 1 SA negotiation completions. In the figure, bi-directional horizontal arrows 712 and 744 are illustrated with the same weight to represent a similar function.

Unidirectional horizontal arrow 748 represents a phase 2 SA negotiation initiation. A phase 2 SA negotiation initiation is a communication protocol, wherein client 604 contacts server 602 to exchange updated security keys, updated authentication information, phase 2 SA soft-lifetime time values and phase 2 SA hard-lifetime time values.

Bi-directional horizontal arrow 752 represents a phase 2 SA negotiation completion.

Bi-directional horizontal arrow 754 represents a link initiation. A link initiation is the start of a secure communication channel, wherein client 604 and server 602 may securely communicate with one another.

Bi-directional horizontal dotted arrow 726 represents a link completion. A link completion is the end of a secure communication channel, wherein client 604 and server 602 may no longer securely communicate with one another.

A large portion of the elements of FIG. 7 are identical to FIG. 3. Some of the identical elements between FIG. 3 and FIG. 7 are not be included in the discussion of FIG. 7. At time 312, client 604 communicates a phase 1 SA negotiation initiation 706 to server 602. Following phase 1 SA negotiation initiation 706, an embodiment of this invention is deployed during the negotiation of phase 1 SA, as client 604 configures a phase 1 SA timer 708 as a positive integer multiple of soft phase 2 SA timer 332. For this particular embodiment of the invention, phase 1 SA timer 708 is configured as two times the value, or N equal to 2, of soft phase 2 SA timer 332. Additionally, an embodiment of this invention is deployed during the negotiation of first SA, as server 602 configures a phase 1 SA timer 710 as a positive integer multiple of soft phase 2 SA timer 334. For this particular embodiment of the invention, phase 1 SA timer 710 is configured as two times the value, or N equal to 2, of soft phase 2 SA timer 334.

The illustration of link communication 700 as shown in FIG. 7 is not to scale. The value of phase 1 SA timer 708 does not appear to be twice the value of soft phase 2 SA timer 332, however, the period of time between time 324 and time 336 is very small relative to the length of time between time 336 and time 348 as represented by soft phase 2 SA timer 332.

The phase 1 SA negotiation between client 604 and server 602 is completed at time 324 and is represented by a phase 1 SA negotiation completion 712. In conjunction with phase 1 SA negotiation completion 712, client 604 initiates phase 1 SA timer 708 and server 602 initiates phase 1 SA timer 710.

At time 506, communication disruption 508 is experienced by server 602. After server 602 recovers or reinitializes, client 604 detects communication disruption 508 using IKE Notify messages via phase 1 SA protocol. As a result of the IKE Notify messages, client 604 and server 602 initiate a DPD 714 at a time 716 in order to restore server 602 to its state or condition prior to communication disruption 508. At a time 718 secure communications are restored between client 604 and server 602 as represented by a communication restoration 720.

During the time period between time 506 and time 718, secure data is not communicated between client 604 and server 602 and is represented as a discarded data 722. The length of time for discarded data 722 is significantly smaller than the length of time as represented by discarded data 516 as illustrated in FIG. 5. The reduction in time between discarded data 722 and discarded data 516 is a direct result of an implementation of an embodiment of this invention.

Following communication restoration 720, the secure transmission of the data between client 604 and server 602 is completed at a time 724 as referenced by a successful link completion 726.

Following the simultaneous expiration of phase 1 SA timer 708, phase 1 SA timer 710, soft phase 2 SA timer 352 and soft phase 2 SA timer 354 at a time 728, client 604 seeks to communicate with server 602 at a time 730. Since neither a phase 1 SA nor a phase 2 SA exists at time 730, a phase 1 SA is initiated between client 604 and server 602 at time 730 as represented by a phase 1 SA negotiation initiation 732.

Following phase 1 SA negotiation initiation 732, client 604 and server 602 negotiate the value of a phase 1 SA timer 734 and a phase 1 SA timer 736. Phase 1 SA timer 734 and phase 1 SA timer 736 are configured per an embodiment of this invention with N equal to 2, or the value of phase 1 SA timer 734 being configured as twice the value of a soft phase 2 SA timer 738 and the value of phase 1 SA timer 736 being configured as twice the value of a soft phase 2 SA timer 740. The initial values of phase 1 SA timer 734 and phase 1 SA timer 736 are identical. At a time 742, phase 1 SA negotiation is complete as represented by a phase 1 SA negotiation completion 744 and client 604 initiates phase 1 SA timer 734 and server 602 initiates phase 1 SA timer 736.

At a time 746, client 604 communicates a phase 2 SA negotiation initiation 748 with server 602 initiating negotiation of IPsec SA. During the negotiation of IPsec SA, client 604 and server 602 agree on the protocol for communication, the value for soft phase 2 SA timer 738 and soft phase 2 SA timer 740. The values for soft phase 2 SA timer 738 and soft phase 2 SA timer 740 are identical and are determined per an embodiment of this invention with N equal to 2. At a time 750 negotiation of IPsec SA is complete and is represented by a phase 2 SA negotiation completion 752. In conjunction with phase 2 SA negotiation completion 752, client 604 implements soft phase 2 SA timer 738 and server 602 implements soft phase 2 SA timer 740.

Following phase 2 SA negotiation completion 752, a link initiation 754 occurs at a time 756 and secure data communication between client 604 and server 602 ensues.

As illustrated in FIG. 7, this invention prevents extended time periods of non-communication by rapidly reestablishing secure communication in the event of a communication disruption. The amount of time required for recovery of secure communications as a result of an embodiment of this invention as illustrated by discarded data 722 in FIG. 7 is significantly less than the time required for recovery as illustrated in FIG. 5 by discarded data 516.

By configuring the expiration of phase 1 SA and phase 2 SA soft-lifetimes in accordance with equation (1), the uniform recovery of secure communications is enabled. The phase 1 SA and phase 2 SA timing agreements between server and client in accordance with the present invention enable the uniform existence of phase 1 SA, thereby enabling uniform recovery from service disruptions via DPD. This eliminates time periods during which a phase 1 SA is not available for recovery of secure communications via DPD.

Figure 8:
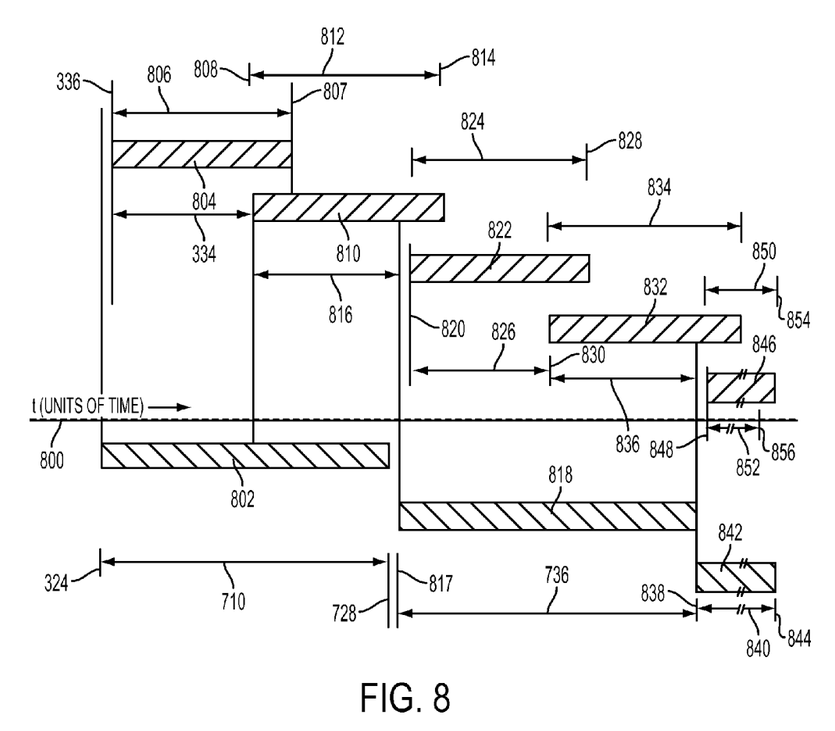
FIG. 8 illustrates, in accordance with an embodiment of the present invention, a relationship diagram between phase 1 SA and phase 2 SA in which DPD is always available for recovery of secure communications in the event of a communication disruption.

FIG. 8 illustrates, in accordance with an embodiment of the present invention, a simplified relationship diagram representing the synchronization between peers with respect to phase 1 SA and phase 2 SA. FIG. 8 illustrates the relationship between phase 1 SA, phase 2 SA, phase 1 SA timer, soft phase 2 SA timer and hard phase 2 SA timer as embodied by this invention. FIG. 8 illustrates how this invention enables the uniform implementation of DPD for recovery of secure communications thereby avoiding sustained periods of non-communication as a result of communication disruptions.

An x-axis 800 of FIG. 8 represents the variable t in units of time with variable t increasing with progression from left to right on the page.

Before FIG. 8 is discussed in detail, please consider the following introduction to some aspects.

The area located below x-axis 800 is represented by phase 1 SAs. The area located above x-axis 800 is represented by phase 2 SAs.

Rectangular blocks 804, 810, 822, 832 and 846 represent phase 2 SAs. Horizontal arrows 816, 826, 836 and 852 represent soft phase 2 SA timers. Horizontal arrows 806, 812, 824, 834 and 850 represent hard phase 2 SA timers.

Rectangular blocks 802, 818 and 842 represent phase 1 SAs. Horizontal arrows 710, 736 and 840 represent phase 1 SA timers.

In order to simplify FIG. 8, all timers will be referenced with respect to server 602 illustrated in FIG. 7.

At time 324, a phase 1 SA 802 is initiated between client 604 and server 602. The lifetime of phase 1 SA 802 is negotiated between client 604 and server 602 and is represented by phase 1 SA timer 710. The lifetime of phase 1 SA 802 and the value for phase 1 SA timer 710 are determined via an embodiment of this invention with N equal to 2 or twice the value of soft phase 2 SA timer 334.

At time 336, a phase 2 SA 804 is initiated between client 604 and server 602. The lifetime of phase 2 SA 804 is negotiated between client 604 and server 602 and is represented by a hard phase 2 SA timer 806 which initiates at time 336 and expires at a time 807.

The value for soft phase 2 SA timer 334 is derived from hard phase 2 SA timer 806, which is negotiated between client 604 and server 602 during the negotiation of phase 2 SA 804. The expiration of soft phase 2 SA timer 334 determines when a subsequent phase 2 SA may be initiated. The value of soft phase 2 SA timer 334 is determined via an embodiment of this invention with N equal to 2.

At a time 808, soft phase 2 SA timer 334 expires enabling the start of a phase 2 SA 810. During the negotiation of phase 2 SA 810, client 604 and server 602 negotiate the values for a hard phase 2 SA timer 812, expiring at a time 814, and a soft phase 2 SA timer 816. The value of soft phase 2 SA timer 816 is determined by an embodiment of this invention with N equal to 2.

Phase 1 SA 802 terminates after the expiration of phase 1 SA timer 710 at time 728. Soft phase 2 SA timer 816 expires at a time 817 and since a phase 1 SA does not exist, a phase 1 SA 818 is negotiated and the value for phase 1 SA timer 736 is determined during the negotiation of phase 1 SA 818. The lifetime of phase 1 SA 818 and the value for a phase 1 SA timer 736 are determined via an embodiment of this invention with N equal to 2.

At a time 820, a phase 2 SA 822 is negotiated, wherein the value for hard phase 2 SA timer 824 is negotiated and wherein a value for soft phase 2 SA timer 826 is derived from the negotiated value for hard phase 2 SA timer 824. Hard phase 2 SA timer 824 determines the lifetime of phase 2 SA 822, which expires at a time 828. Soft phase 2 SA timer 826 determines the time after which a new phase 2 SA may be initiated. In an example embodiment, the value for soft phase 2 SA timer 826 is set as N equal to 2.

Soft phase 2 SA timer 826 expires at a time 830 enabling the initiation of a phase 2 SA 832. The value for hard phase 2 SA timer 834 is negotiated during the negotiation of phase 2 SA 832. A value for soft phase 2 SA timer 836 is derived from the negotiated value for hard phase 2 SA timer 834. Hard phase 2 SA timer 834 determines the lifetime of phase 2 SA 832 and soft phase 2 SA timer 836 determines the time after which a new phase 2 SA may be initiated. The value for soft phase 2 SA timer 836 is determined via an embodiment of this invention with N equal to 2.

Phase 1 SA timer 736 expires at a time 838 terminating phase 1 SA 818. In conjunction with the expiration of phase 1 SA 818, soft phase 2 SA timer 836 expires enabling the initiation of a new phase 2 SA. However, since a phase 1 SA does not exist, a phase 1 SA 842 is initiated at time 838 and the value for a phase 1 SA timer 840 is negotiated. Phase 1 SA timer 840 determines the lifetime of phase 1 SA 842 and expires at a time 844. The value for phase 1 SA timer 840 is determined via an embodiment of this invention with N equal to 2.

A phase 2 SA 846 is negotiated between client 604 and server 602 at a time 848 and the value for hard phase 2 SA timer 850 is negotiated during the negotiation of phase 2 SA 846. A value for soft phase 2 SA timer 852 is derived from the negotiated value for hard phase 2 SA timer 850. Hard phase 2 SA timer 850, expiring at a time 854, determines the lifetime of phase 2 SA 846 and soft phase 2 SA timer 852, expiring at a time 856, determines the time after which a new phase 2 SA may be initiated. The value for soft phase 2 SA timer 852 is determined via an embodiment of this invention with N equal to 2.

As illustrated in FIG. 8, this invention prevents periods of time during which a communication disruption would cause an extended period of time for non-communication. The time periods during which a communication disruption can cause non-communication as illustrated for a conventional system in FIG. 2 and represented by unavailable DPD 218 and unavailable DPD 246 are not experienced in FIG. 8 as a result of an embodiment of this invention.

By configuring the expiration of phase 1 SA and phase 2 SA soft-lifetimes in accordance with equation (1), the relationship between phase 1 SA and phase 2 SA is configured in order to provide the uniform existence of phase 1 SA during secure communications. The uniform existence of phase 1 SA provides the ability to uniformly recover from service disruptions between server and client via DPD, as DPD can only be implemented during the existence of a phase 1 SA.

A device in accordance with the present invention may be any device operable to communicate with another device within an Internet Protocol (IP) communication system. Non-limiting examples of such devices include computers and phones, for example as discussed above with reference to FIG. 1.

A communication device in accordance with the present invention may include an IKE protocol portion 222 and an IPsec portion 608. In some embodiments, IKE protocol portion 222 and an IPsec portion 608 may be implemented as individual processing portions. In some embodiments, IKE protocol portion 222 and an IPsec portion 608 may be implemented as a unitary processing portion.

A communication device in accordance with the present invention may additionally include a transmitter portion that can transmit wireless or wireline signals. Non-limiting examples of transmitter portions include transmitter portions that can transmit wireless or wireline public switched telephone network signals and transmitter portions that transmit wireless or wireline broadband Internet access signals, e.g., WiMax signals.

Further, in accordance with an aspect of the present invention, a device readable media for use with a communication device may have device-readable instructions stored thereon. In particular, the device-readable instructions may be capable of instructing the communication device to communicate with another device within an Internet Protocol (IP) communication system such that the time value of the phase 1 security association is an integer multiple of the time value of the soft phase 2 security association in accordance with the present invention. A non-limiting example of such a device readable media includes a hardware memory portion of a processing unit, wherein the processing unit is operable to process the instructions within the hardware memory portion.

The foregoing description of various preferred embodiments of the invention have been presented for purposes of illustration and description. It is not intended to be exhaustive or to limit the invention to the precise forms disclosed, and obviously many modifications and variations are possible in light of the above teaching. The exemplary embodiments, as described above, were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed as new and desired to be protected by Letters Patent of the United States is:

1. A method of communicating between a first communication device and a second communication device, said method comprising:
    establishing a phase 1 security association between the first communication device and the second communication device, the phase 1 security association having a phase 1 security association timer corresponding to a time value of the phase 1 security association; and
    establishing a phase 2 security association between the first communication device and the second communication device, the phase 2 security association having a soft phase 2 security association timer and a hard phase 2 security association timer, the soft phase 2 security association timer corresponding to a time value of a soft phase 2 security association, the hard phase 2 security association timer corresponding to a time value of a hard phase 2 security association, wherein the time value of the soft phase 2 security association is less than the time value of the hard phase 2 security association, and
    wherein the time value of the phase 1 security association is derived from the time value of the soft phase 2 security association such that the time value of the phase 1 security association is an integer multiple of the time value of the soft phase 2 security association.

2. The method of claim 1, wherein said establishing a phase 1 security association between the first communication device and the second communication device comprises:
    initiating the phase 1 security association between the first communication device and the second communication device; and
    completing the phase 1 security association between the first communication device and the second communication device.

3. The method of claim 2, wherein said establishing a phase 2 security association between the first communication device and the second communication device comprises:
    initiating the phase 2 security association between the first communication device and the second communication device; and
    completing the phase 2 security association between the first communication device and the second communication device.

4. The method of claim 3, further comprising:
    establishing a communication link between the first communication device and the second communication device; and
    exchanging information between the first communication device and the second communication device over the established communication link, wherein said completing the phase 2 security association between the first communication device and the second communication device is performed after said completing the phase 1 security association between the first communication device and the second communication device, and
    wherein said establishing a communication link between the first communication device and the second communication device is performed after said completing the phase 2 security association between the first communication device and the second communication device.

5. The method of claim 4, further comprising ending the established communication link.

6. The method of claim 5, further comprising establishing a second phase 2 security association between the first communication device and the second communication device, the second phase 2 security association having a second soft phase 2 security association timer and a second hard phase 2 security association timer.

7. The method of claim 1, wherein said establishing a phase 2 security association between the first communication device and the second communication device comprises:
    initiating the phase 2 security association between the first communication device and the second communication device; and
    completing the phase 2 security association between the first communication device and the second communication device.

8. The method of claim 7, further comprising establishing a second phase 2 security association between the first communication device and the second communication device, the second phase 2 security association having a second soft phase 2 security association timer and a second hard phase 2 security association timer.

9. The method of claim 1, wherein:
    a new time value of the phase 1 security association is not automatically configured until a new soft phase 2 security association is requested, and
    the new time value of the phase 1 security association is configured automatically to be an integer multiple of a new time value of the soft phase 2 security association after the new soft phase 2 security association is requested.

10. A communication device operable to communicate with a second communication device, said communication device comprising:
    an internet key exchange protocol portion operable to negotiate a phase 1 security association with the second communication device, the phase 1 security association having a phase 1 security association timer corresponding to a time value of the phase 1 security association; and
    an IPsec portion operable to establish a phase 2 security association, the phase 2 security association having a soft phase 2 security association timer and a hard phase 2 security association timer, the soft phase 2 security association timer corresponding to a time value of a soft phase 2 security association, the hard phase 2 security association timer corresponding to a time value of a hard phase 2 security association, wherein the time value of the soft phase 2 security association is less than the time value of the hard phase 2 security association, and wherein the time value of the phase 1 security association is derived from the time value of the soft phase 2 security association such that the time value of the phase 1 security association is an integer multiple of the time value of the soft phase 2 security association.

11. The communication device of claim 10, wherein said internet key exchange protocol portion and said IPsec portion are a unitary portion.

12. The communication device of claim 10, wherein said internet key exchange protocol portion and said IPsec portion are separate portions.

13. The communication device of claim 10, further comprising a transmitter portion operable to transmit wireless signals or wireline signals.

14. The communication device of claim 13, wherein said transmitter portion is further operable to transmit wireless public switched telephone network signals or wireline public switched telephone network signals.

15. The communication device of claim 14, wherein said transmitter portion is further operable to transmit wireless broadband Internet access signals or wireline broadband Internet access signals.

16. The communication device of claim 13, wherein said transmitter portion is further operable to transmit wireless broadband Internet access signals or wireline broadband Internet access signals.

17. A non-transitory device readable media for use with a first device for communicating with a second communication device, the device readable media having device-readable instructions stored thereon, the device-readable instructions being capable of instructing the first device to:
establish a phase 1 security association between the first communication device and the second communication device, the phase 1 security association having a phase 1 security association timer corresponding to a time value of the phase 1 security association; and
establish a phase 2 security association between the first communication device and the second communication device, the phase 2 security association having a soft phase 2 security association timer and a hard phase 2 security association timer, the soft phase 2 security association timer corresponding to a time value of a soft phase 2 security association, the hard phase 2 security association timer corresponding to a time value of a hard phase 2 security association, wherein the time value of the soft phase 2 security association is less than the time value of the hard phase 2 security association, and wherein the time value of the phase 1 security association is derived from the time value of the soft phase 2 security association such that the time value of the phase 1 security association is to be an integer multiple of the time value of the soft phase 2 security association.

18. The non-transitory device readable media of claim 17, wherein the device-readable instructions being capable of instructing the first device to establish a phase 1 security association between the first communication device and the second communication device comprises device-readable instructions being capable of instructing the first device to:
initiate the phase 1 security association between the first communication device and the second communication device; and
complete the phase 1 security association between the first communication device and the second communication device.

19. The non-transitory device readable media of claim 18, wherein the device-readable instructions being capable of instructing the first device to establish a phase 2 security association between the first communication device and the second communication device comprises device-readable instructions being capable of instructing the first device to:
initiate the phase 2 security association between the first communication device and the second communication device; and
complete the phase 2 security association between the first communication device and the second communication device.

20. The non-transitory device readable media of claim 19, further comprises device-readable instructions being capable of instructing the first device to:
establish a communication link between the first communication device and the second communication device; and
exchange information between the first communication device and the second communication device over the established communication link, wherein the device-readable instructions being capable of instructing the first device to complete the phase 2 security association between the first communication device and the second communication device after completing the phase 1 security association between the first communication device and the second communication device, and wherein the device-readable instructions being capable of instructing the first device to establish a communication link between the first communication device and the second communication device after completing the phase 2 security association between the first communication device and the second communication device.

21. The non-transitory device readable media of claim 20, further comprises device-readable instructions being capable of instructing the first device to end the established communication link.

* * * * *